(12) United States Patent
Alkouh

(10) Patent No.: US 10,275,925 B2
(45) Date of Patent: Apr. 30, 2019

(54) BLEND SHAPE SYSTEM WITH TEXTURE COORDINATE BLENDING

(71) Applicant: SONY INTERACTIVE ENTERTAINMENT AMERICA, LLC, San Mateo, CA (US)

(72) Inventor: Homoud B. Alkouh, San Diego, CA (US)

(73) Assignee: Sony Interactive Entertainment America, LLC, San Mateo, CA (US)

( * ) Notice: Subject to any disclaimer, the term of this patent is extended or adjusted under 35 U.S.C. 154(b) by 110 days.

(21) Appl. No.: 15/280,861

(22) Filed: Sep. 29, 2016

(65) Prior Publication Data

US 2018/0089882 A1 Mar. 29, 2018

(51) Int. Cl.
| | | |
|---|---|---|
| *G06T 15/00* | (2011.01) | |
| *G06T 13/20* | (2011.01) | |
| *G06T 15/04* | (2011.01) | |
| *G06T 17/10* | (2006.01) | |
| *G06F 3/0484* | (2013.01) | |

(52) U.S. Cl.
CPC ........ *G06T 15/005* (2013.01); *G06F 3/04847* (2013.01); *G06T 13/20* (2013.01); *G06T 15/04* (2013.01); *G06T 17/10* (2013.01)

(58) Field of Classification Search
None
See application file for complete search history.

(56) References Cited

U.S. PATENT DOCUMENTS

| | | | | |
|---|---|---|---|---|
| 6,448,971 B1* | 9/2002 | Seefeldt | .................. | G06T 15/04 345/475 |
| 6,850,243 B1* | 2/2005 | Kilgariff | ................. | G06T 15/04 345/421 |
| 6,906,732 B1* | 6/2005 | Li | ........................... | G06T 13/00 345/582 |
| 6,919,904 B1* | 7/2005 | Kilgariff | ................. | G06T 15/04 345/426 |
| 7,542,036 B2* | 6/2009 | Museth | .................... | G06T 17/00 345/420 |
| 2005/0219250 A1* | 10/2005 | Sepulveda | .............. | G06T 13/40 345/473 |
| 2009/0213138 A1* | 8/2009 | DeRose | .................. | G06T 13/00 345/619 |

(Continued)

*Primary Examiner* — Hilina K Demeter
(74) *Attorney, Agent, or Firm* — Seed Intellectual Property Law Group LLP

(57) ABSTRACT

A blend shape method and system that modifies the U-V values associated with vertices in blend shapes constructed in a 3-D blend shape combination system. The blend shape method determines the U-V coordinates associated with each vertex in a base shape and the U-V coordinates associated with corresponding vertices in one or more driving shapes. The method calculates U-V delta values that are associated with vertices in the driving shape. The method multiplies the U-V delta values by a weight value associated with the driving shape to determine a transitional U-V delta value for each vertex. The transitional U-V delta value for each vertex is added to the U-V coordinates for the corresponding vertex in the base shape to determine the modified U-V coordinates for the resulting blend shape. Multiple driving shapes may be used with each shape contributing to the modified U-V values according to its relative weight.

20 Claims, 10 Drawing Sheets

(56) References Cited

U.S. PATENT DOCUMENTS

| | | |
|---|---|---|
| 2013/0314412 A1 | 11/2013 | Gravois et al. |
| 2014/0049535 A1 | 2/2014 | Wang et al. |
| 2016/0035142 A1 | 2/2016 | Nair et al. |
| 2016/0042548 A1* | 2/2016 | Du .......................... G06T 13/40 345/473 |
| 2016/0247308 A1* | 8/2016 | Jiao ......................... G06T 13/40 |
| 2016/0247309 A1* | 8/2016 | Li ............................ G06F 3/011 |

\* cited by examiner

BLEND SHAPE SYSTEM WITH TEXTURE COORDINATE BLENDING

TECHNICAL FIELD

The present disclosure generally relates to providing improved graphics rendering in three-dimensional and virtual reality spaces. More particularly, but not exclusively, the present disclosure relates to improved control for morph target animation.

BACKGROUND

Description of the Related Art

Designers use U-V space to specify textures and other graphics to be applied to three-dimensional objects that are rendered on a two-dimensional display. The U-V space is used to store graphics maps, textures, designs, or other features that are mapped or painted onto a 3-D model as part of the rendering process. Each texture pixel in the U-V space is referred to as a texel. When modeling a three-dimensional object, the object may be partitioned into multiple polygons, such as triangles, with the vertices of each of these polygons being assigned a value for a location or texel in the U-V space. The system may use a number of different processes to determine the correct texel information for those points in the interior of the polygon. Once the texture and other graphics have been applied to a three-dimensional model, the model may be rendered on a two-dimensional display.

Blend shape combination systems enable designers to move and manipulate three-dimensional objects. In these systems, designers may "deform" a neutral base shape into one or more target shapes, which may also be referred to as driving shapes. For example, the neutral base shape may be a face with a neutral expression, and the target or driving shapes may be the same face with different expressions, such as angry, happy, sad, or the like. The blend shape combination system may create the different driving shapes by moving the vertices of the polygons that are used to create the three-dimensional model. During this process, the vertices may move relative to one another, resulting in the polygons changing shapes—e.g., expanding or contracting. Designers may create a desired modified expression by assigning weight values to the various driving shapes, with the weight values determining how much of each driving shape contributes to the desired expression. During animation, a three-dimensional model may change, or morph, between different desired expressions by changing the respective weight values assigned to the various driving shapes. This process may result in changing the positions of the vertices relative to one another, resulting in polygons of different sizes.

FIG. 1A is an illustration of a 3-D model created using a prior art system in which the U-V location information is not updated or modified as the 3-D model is altered. In current blend shape systems, the texel information assigned to each vertex may not change even as the vertices move relative to each other resulting in polygons of varying sizes. Accordingly, the texel density of a polygon may decrease when the polygon increases in area as the three-dimensional model moves between target shapes. Unfortunately, this process produces unintended and unwanted effects. For example, as shown in FIG. 1A, a three-dimensional model of a person may include a feature, such as a letter "A" 10, on the person's cheek 12. As shown in FIG. 1B, the letter "A" 20 expands as the person's cheek 22 expands, or is puffed out, because the polygons used to model the person's cheek, including the polygons used to render the "A" 20, have become larger and the resulting texel density has become smaller. The resulting image appears stretched and unnatural, thus negatively impacting the user's experience and causing the user to suspend their belief that the 3-D model is realistic—a phenomenon referred to as the Uncanny Valley Effect.

Prior systems attempted to correct the disparity in texel density, and the resulting stretching of the associated graphics, in various ways. For example, in some prior art systems, designers and animators attempted to blend between two different textures in the same U-V space as the polygons in the 3-D model stretched. In this case, one texture is depicted in a base shape U-V space, and the other texture is depicted as the correct size for the morphed shape in the base shape U-V space that is expanded. This technique, however, results in blurriness as the system transitions between the different U-V spaces. The technique also results in "swimming" in which texture and designs abruptly move between polygons as the mix of the two textures over the base U-V spaces are transitioning. This requires significant time and effort by the designer or animator to correct for these distortions manually. Other systems assign separate textures to each polygon without using or requiring a U-V assignment. These prior techniques, however, may result in further unintended consequences such as pixel swimming and momentary blurring. Again, such prior art techniques require the designer or animator to manually correct for the design and texture errors each time the three-dimensional model is altered.

BRIEF SUMMARY

Briefly and in general terms, there is disclosed a method for rendering graphic images and improving control of morph target animation. More particularly, there is disclosed a method for modifying U-V values for a blend shape model, the blend shape model having a surface and being formed by deforming a base shape according to a drive shape, the base shape comprising a first set of vertices, and the drive shape comprising a second set of vertices corresponding to the first set of vertices. The method may be summarized as including: associating U-V values from a graphics map to each vertex in the first set of vertices as base U-V values; determining U-V delta values for each vertex in the second set of vertices; receiving a weight value for the drive shape; applying the weight value to the U-V delta values to determine transitional U-V delta values for each vertex in the second set of vertices; combining the transitional U-V delta values for each vertex with the base U-V values associated with the corresponding vertex in the first set of vertices to determine updated U-V values for each vertex; and using the updated U-V values for each vertex to apply graphics to the blend shape model.

Continuing, the method determines the U-V delta values by subtracting the U-V values associated with the vertices in the first set of vertices from the U-V values associated with the vertices in the second set of vertices. The method may further include associating the U-V delta values for a vertex with positional delta values for the vertex. Still further, the method may include a second drive shape having a third set of vertices corresponding to the first set of vertices, and may further include: determining second U-V delta values for each vertex in the third set of vertices; receiving a second weight value; applying the second weight value to the second U-V delta values to determine second transitional U-V delta values for each vertex in the third set of vertices;

combining the second transitional U-V delta values for each vertex, the first transitional U-V delta values for each corresponding vertex, and the base U-V values associated with each corresponding vertex to determine a second updated U-V value for each vertex; and using the second updated U-V value for each vertex to apply graphics to the blend shape model. The graphics applied to the blend shape model may be applied from the graphics map. The method may use the updated U-V values for each vertex to apply graphics to the blend shape model and may further include sliding the graphics across the surface of the blend shape model. The method applies the weight value to the U-V delta values to determine transitional U-V delta values for each vertex in the second set of vertices and may further include applying a function to the weight value to determine an effective weight value and multiplying the effective weight value with the U-V delta values.

Still further, a method for rendering a three-dimensional image having a surface may be summarized as including: obtaining a drive shape; obtaining a base shape; determining U-V values associated with vertices in the drive shape; determining U-V values associated with vertices in the base shape; receiving a weight value for the drive shape; determining U-V delta values for each vertex by subtracting the U-V values for the base shape from the U-V values for the drive shape; associating the U-V delta values for a vertex with positional delta values for the vertex; multiplying the positional delta values and the U-V delta values by the weight value to determine transitional position values and transitional U-V values; storing the transitional position values and transitional U-V values in a memory; and accessing the memory as the base shape is rendered into a blend shape based on the weight value for the drive shape and graphics from a graphics map, wherein the U-V values for the blend shape are based on the transitional U-V values and wherein the position values for the blend shape are based on the transitional position values, so that the graphics remain consistent as the three-dimensional model transitions between blend shapes to avoid distortion in the three-dimensional model.

Obtaining the positional delta values may further include: determining positional values for each vertex in the first set of vertices as base positional values; determining positional values for each vertex in the second set of vertices; determining positional delta values for each vertex in the second set of vertices; multiplying the weight value by the positional delta values to determine transitional position values for each vertex; and altering the blend shape model according to the transitional position values. The method may further include a second drive shape, and may yet further include: determining second U-V delta values for each vertex in the second drive shape; receiving a second weight value; applying the second weight value to the second U-V delta values to determine second transitional U-V delta values for each vertex in the third set of vertices; combining the second transitional U-V delta values for each vertex, the first transitional U-V delta values for each corresponding vertex, and the base U-V values associated with each corresponding vertex to determine second updated U-V values for each vertex; and using the second updated U-V values for each vertex to apply graphics to the blend shape model. The method may further include storing the transitional position values and transitional U-V values in a memory array. Avoiding distortion in the three-dimensional model may include sliding the graphics across the surface of the three-dimensional model as the three-dimensional model transitions between blend shapes.

Also disclosed is a non-transitory computer-readable medium having computer instructions stored thereon, the computer instructions executable by a computer system to carry out a method for determining a blend shape model, the blend shape model having a surface and being formed by deforming a base shape according to a drive shape, the base shape comprising a first set of vertices, and the drive shape comprising a second set of vertices corresponding to the first set of vertices. Continuing, the method may be summarized as including: associating U-V values from a graphics map to each vertex in the first set of vertices as base U-V values; determining U-V delta values for each vertex in the second set of vertices; receiving a weight value for the drive shape; applying the weight value to the U-V delta values to determine transitional U-V delta values for each vertex in the second set of vertices; combining the transitional U-V delta values for each vertex with the base U-V values associated with the corresponding vertex in the first set of vertices to determine updated U-V values for each vertex; and using the updated U-V values for each vertex to apply graphics to the blend shape model.

Determining the U-V delta values may include subtracting the U-V values associated with the vertices in the first set of vertices from the U-V values associated with the vertices in the second set of vertices. In addition, the method may further include: associating the U-V delta values for a vertex with the positional delta values for the vertex. The method may further include having a second drive shape having a third set of vertices corresponding to the first set of vertices. The method may further include: determining second U-V delta values for each vertex in the third set of vertices; receiving a second weight value; applying the second weight value to the second U-V delta values to determine second transitional U-V delta values for each vertex in the third set of vertices; combining the second transitional U-V delta values for each vertex, the first transitional U-V delta values for each corresponding vertex, and the base U-V values associated with each corresponding vertex to determine second updated U-V values for each vertex; and using the second updated U-V values for each vertex to apply graphics to the blend shape model. The graphics applied to the blend shape may be applied from the graphics map. The method uses the updated U-V values for each vertex to apply graphics to the blend shape model and may further include sliding the graphics across the surface of the blend shape model. The method applies the second weight value to the second U-V delta values to determine second transitional U-V delta values for each vertex in the third set of vertices and may further include applying a function to the weight value to determine an effective weight value and multiplying the effective weight value with the U-V delta values. In addition, the method may further include: obtaining the weight value from a slider feature rendered on a display of the computer system, the slider feature having a slider start value and a total slider width, applying the weight value to the U-V delta values to determine transitional U-V delta values for each vertex in the second set of vertices and subtracting the slider start value from the weight value to calculate a difference; dividing the difference by the total slider width to calculate an effective weight value; and multiplying the U-V delta values by the effective weight value to calculate the transitional U-V delta values.

Other features and aspects of the disclosed technology will become apparent from the following detailed description, taken in conjunction with the accompanying drawings, which illustrate by way of example, the features of the various embodiments.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1B:
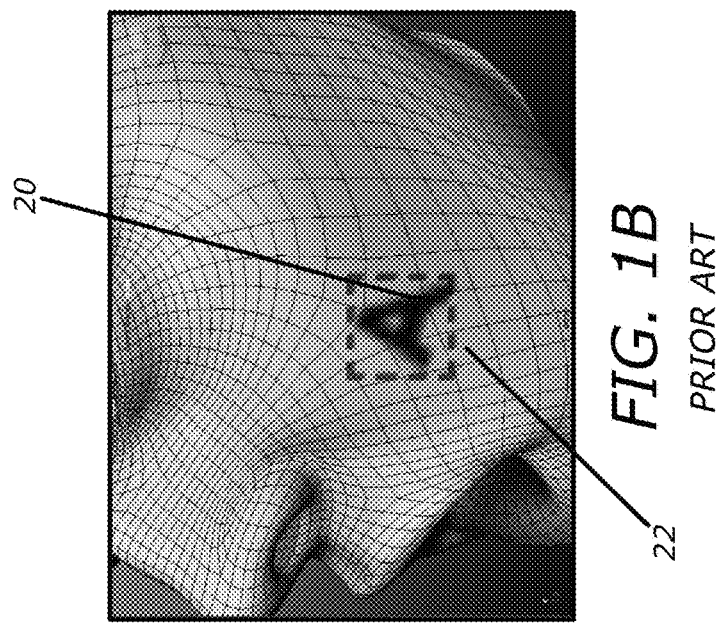
FIG. 1B is an illustration of the 3-D model shown in FIG. 1A, altered to show the cheek of the 3-D model puffed out, in which the 3-D model is created using a prior art system in which the U-V location information is not updated or modified as the 3-D model is altered.
Figure 1A:
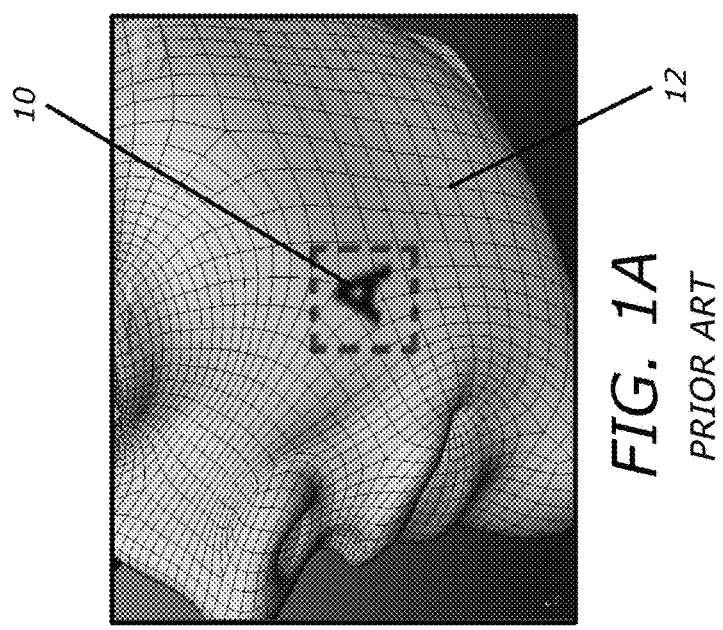
FIG. 1A is an illustration of a 3-D model created using a prior art system in which a letter "A" is shown on the cheek of the 3-D model.

Persons of ordinary skill in the art will understand that the present disclosure is illustrative only and not in any way limiting. Other embodiments of the presently disclosed system and method readily suggest themselves to such skilled persons having the assistance of this disclosure. In the following description, certain specific details are set forth in order to provide a thorough understanding of various disclosed embodiments or implementations. However, one skilled in the relevant art will recognize that embodiments or implementations may be practiced without one or more of these specific details, or with other methods, components, materials, etc. In other instances, well-known structures associated with the various embodiments or implementations have not been shown or described in detail to avoid unnecessarily obscuring descriptions of the embodiments or implementations.

Each of the features and teachings disclosed herein can be utilized separately or in conjunction with other features and teachings to provide a 3-D animation design environment in which a model is partitioned into composite polygons to form a polygon mesh. Although the technology disclosed herein relates primarily to animating characters, it will be appreciated that the technology and techniques can be applied to any graphic media using alterable shapes; for example, CAD/CAM and other industrial drawings, radiological media, GPS mapping, engineering, fashion, film, and other graphics related technologies. Representative examples utilizing many of these additional features and teachings, both separately and in combination, are described in further detail with reference to attached FIGS. 2-10. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method.

Unless the context requires otherwise, throughout the specification and claims that follow, the word "comprising" is synonymous with "including," and is inclusive or open-ended (i.e., does not exclude additional, unrecited elements or method acts). The term "herein" refers to the specification, claims, and drawings associated with the current application. As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise. The term "based on" is not exclusive and allows for being based on additional features, functions, aspects, or limitations not described, unless the context clearly dictates otherwise.

Reference throughout this specification to "one embodiment," "an embodiment," "one implementation," or "an implementation" means that a particular feature, structure or characteristic described in connection with the embodiment or implementation is included in at least one embodiment or implementation. Thus, the appearances of the phrases "in one embodiment," "in an embodiment," "one implementation," or "an implementation" in various places throughout this specification are not necessarily all referring to the same embodiment or implementation. Furthermore, the particular features, structures, or characteristics may be combined in any suitable manner in one or more embodiments or implementations.

The headings and Abstract of the Disclosure provided herein are for convenience only and do not interpret the scope or meaning of the embodiments or implementations.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm, as described herein, is a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages and a variety of 3-D programming or design environments may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Systems and methods for enhancing 3-D modeling using U-V blending are described below in which U-V coordinates associated with the vertices in a 3-D model are updated as the 3-D model moves or is altered between a base shape and one or more driving shapes. In some implementations, a first set of U-V coordinates, also referred to herein as U-V values, are assigned to the vertices in the base shape. A second set of U-V coordinates are assigned to the same vertices in the driving shapes. The U-V coordinates stored in the second set for each driving shape can be absolute U-V locations. The U-V coordinates stored in the second set for each driving shape can be relative U-V values, such as U-V delta values, that reflect the change in U-V location for each vertex between the base shape and the driving shape. In some implementations, the updates to the U-V coordinates are associated with the motion or alteration of the 3-D model in a 3-D space through weight values that are assigned to each of the driving shapes. These weight values are used to determine the contribution that each driving shape makes to the deformation of the base shape that results in the final, blended 3-D model, or blend shape. The weight values are also used to determine the amount of change in the U-V space to be applied to the blend shape by multiplying the weight value with the U-V delta values assigned to each vertex. Accordingly, as each vertex in the 3-D model changes location based on the driving shapes, the 3-D model appears to move or be altered in a 3-D space. At the same time, the U-V coordinates for each vertex are also updated, resulting in the graphics or textures being applied to the 3-D model moving or sliding across the 3-D model's surface as the 3-D model moves or changes shape.

Figure 2:
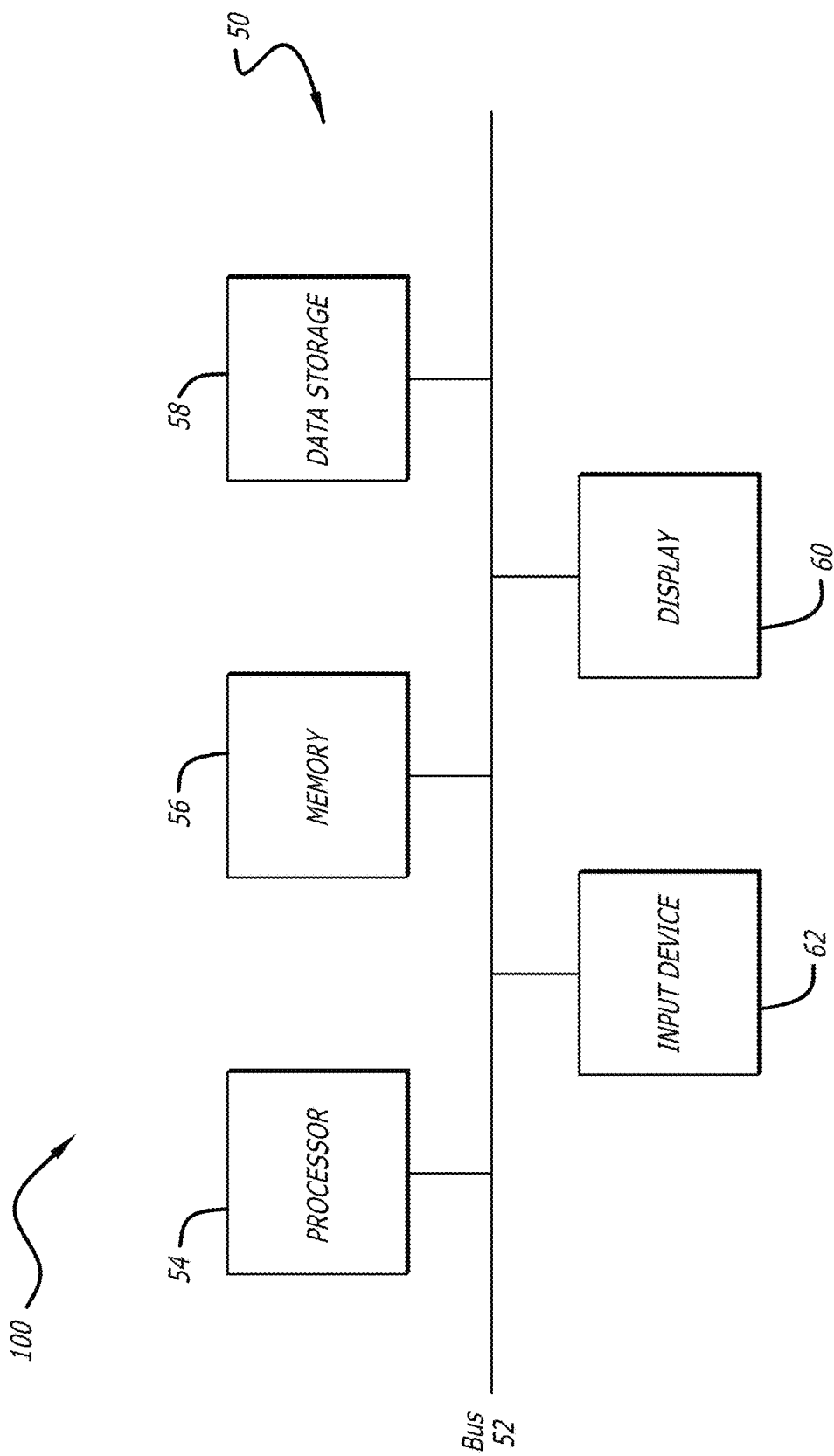
FIG. 2 is a block diagram of a design space system usable to generate blend shapes from a base shape and one or more driving shapes.

Referring to FIG. 2, a design space system 100 generally includes a computer system 50 for generating blend shapes according to the techniques described herein. The computer system 50 includes a bus 52 connecting a processor 54, a memory 56, data storage 58, a display 60 and an input device 62. Generally, this relates to a conventional von Neumann architecture; however, one skilled in the art will appreciate that the techniques described herein are equally applicable to other computer architectures, such as, for example, computer systems having separate data and instruction buses. The computer system 50 includes instructions stored in data storage 58, or on any other computer-readable medium. When executed, these instructions configure the computer system 50 to enable the processor 54 to determine updated U-V coordinates for blend shapes and to store these updated U-V coordinates in memory 56. The processor 54 displays the blend shapes stored in memory 56 by rendering the blend shape to be viewed using display 60. In a preferred implementation, base shapes and driving shapes are entered using a mouse, a keyboard, and/or some combination thereof. However, the input device 62 may be embodied as one or more of the following: a keyboard, a mouse, a trackball, a track pad, a gyroscopic point device, and the like.

The processor 54 includes any device capable of executing instructions to determine the updated U-V values associated with each vertex in a blend shape, such as, for example, those processors commonly used in personal computers, laptops, and/or mobile devices. Furthermore, the processor 54 may include multiple cores for simultaneous and parallel execution.

Figure 3:
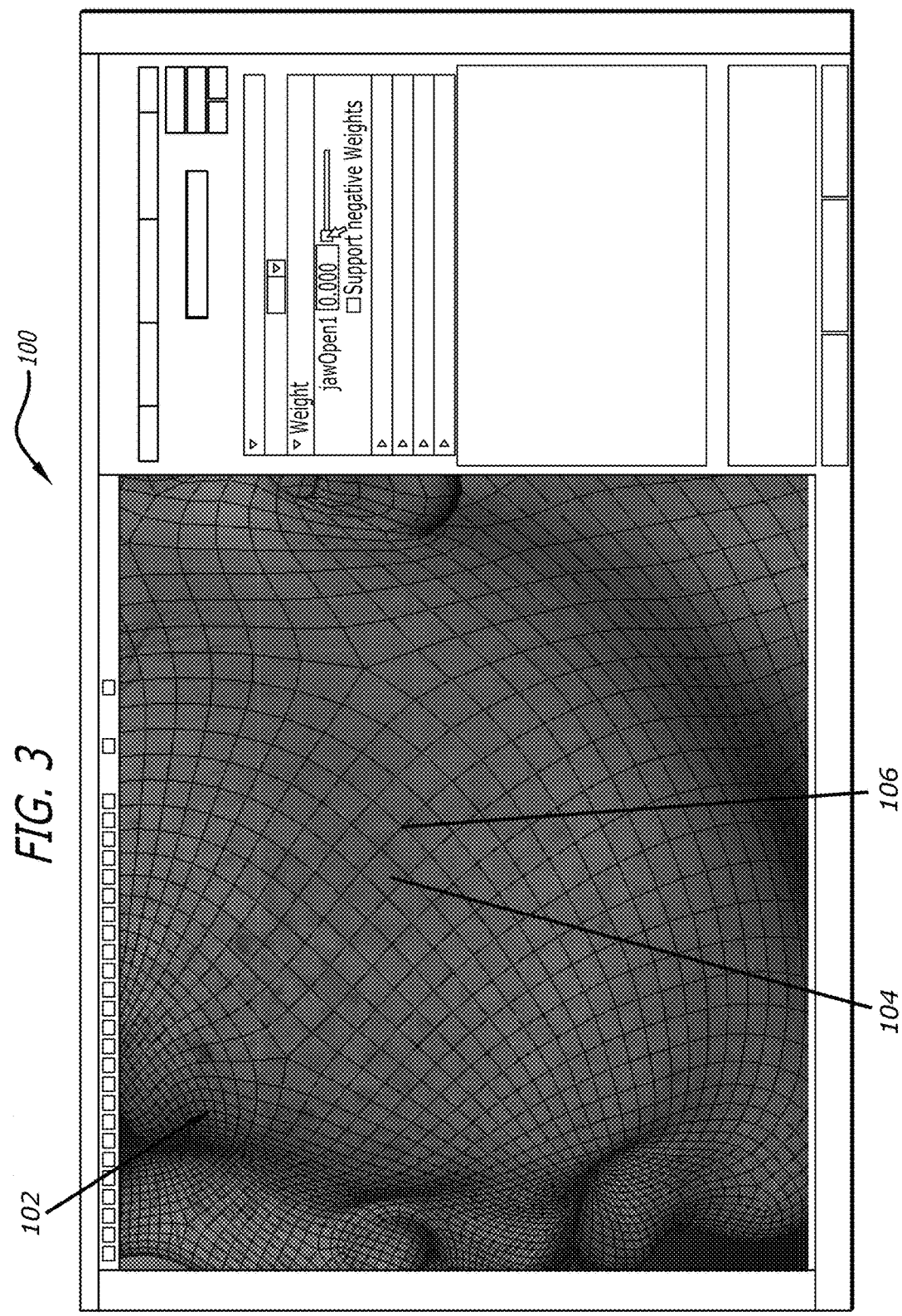
FIG. 3 is an illustration of a base shape as shown in a design space system for 3-D animation, modeling, and rendering, in accordance with one illustrated embodiment.

FIG. 3 is an illustration of a base shape 102 as shown in a design space system 100 for designing and rendering 3-D animation, according to at least one illustrated embodiment. As shown in FIG. 3, the design space system 100 has been used to create the base shape 102, which depicts a person's head. Graphics are applied to the base shape 102, which comprises a plurality of polygons 104. Each polygon in the plurality of polygons 104 covers a portion of the surface of the base shape 102. The plurality of polygons 104 fits together to form a polygon mesh in order to create the base shape 102. The number of polygons used and the size of each polygon are determined by a number of factors. For example, the processing power of the hardware used to animate the 3-D model may provide limits on the number of polygons, and the resulting number of vertices, that may be used in the 3-D model. As another example, relatively smaller polygons may be used on surfaces of the 3-D model to provide a designer with more control over movement and alterations associated with that surface. In some implementations, relatively smaller polygons may be used to model a surface portion that corresponds to a curved surface on the 3-D model.

Each polygon 104 comprises a plurality of vertices 106 that the design space system 100 may use to apply various textures and graphics to the base shape 102. Graphics information, such as for texture, is saved in a U-V space in which U and V coordinates are used to specify locations on a graphics map. In some implementations, the U and V coordinates may be normalized, for example, such that the U coordinates and the V coordinates are each between 0 and 1. Each coordinate in the U-V space may be referred to as a texture element, or texel. In some implementations, the design space system 100 associates each vertex 106 of the polygon 104 with a U-V coordinate corresponding to a specific texel in the U-V space. Accordingly, the portion of the U-V map associated with the polygon 104 is defined by the U-V coordinates or texels associated with each of the vertices 106 of the polygon 104. In some implementations, the design space system 100 may use interpolation techniques to fill-in the graphics for the remaining portion of the polygon 104 using the known U-V values associated with the vertices 106. Accordingly, in some instances, the design space system 100 may stretch or shrink the graphics selected from the U-V map to fit onto the polygon 104. The process of associating graphics from the U-V space may be performed for each of the polygons 104 that comprise the base shape 102.

Figure 4:
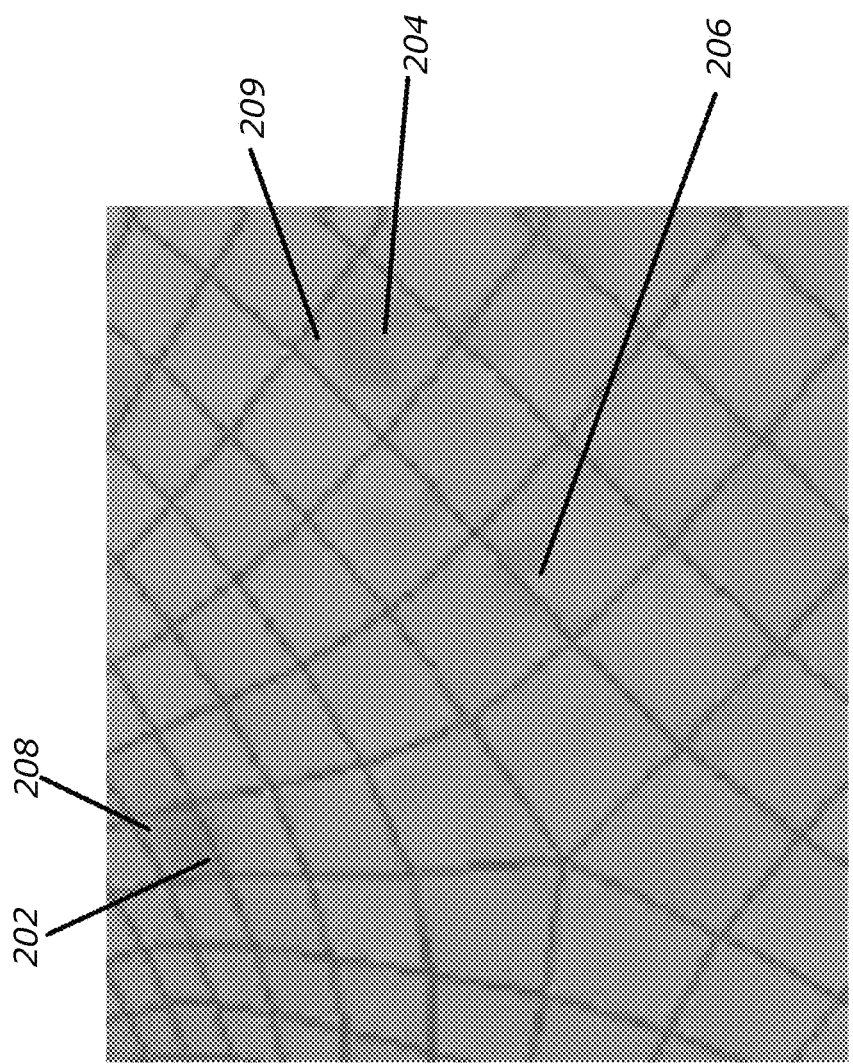
FIG. 4 is an enlarged view of the polygons of the base shape as shown in FIG. 3.

FIG. 4 is an enlarged view of the polygons of the base shape 102 in the design space system 100 showing the polygons, according to at least one illustrated embodiment. As shown, there are a plurality of freckles 202, 204, and 206 on the base shape's surface. By way of example, the freckle 202 appears substantially within polygon 208. The U-V map associated with the base shape 102 provides the graphics information, e.g., color, texture, hue, and the like, to enable the freckle 202 to be mapped and rendered within the polygon 208. Thus, as discussed above, this mapping occurs by associating each of the vertices of the polygon 208 with texel locations on the U-V map that encompass the graphics for the freckle 202. Similarly, freckle 204 is located in the polygon 209 in the same manner.

Figure 5:
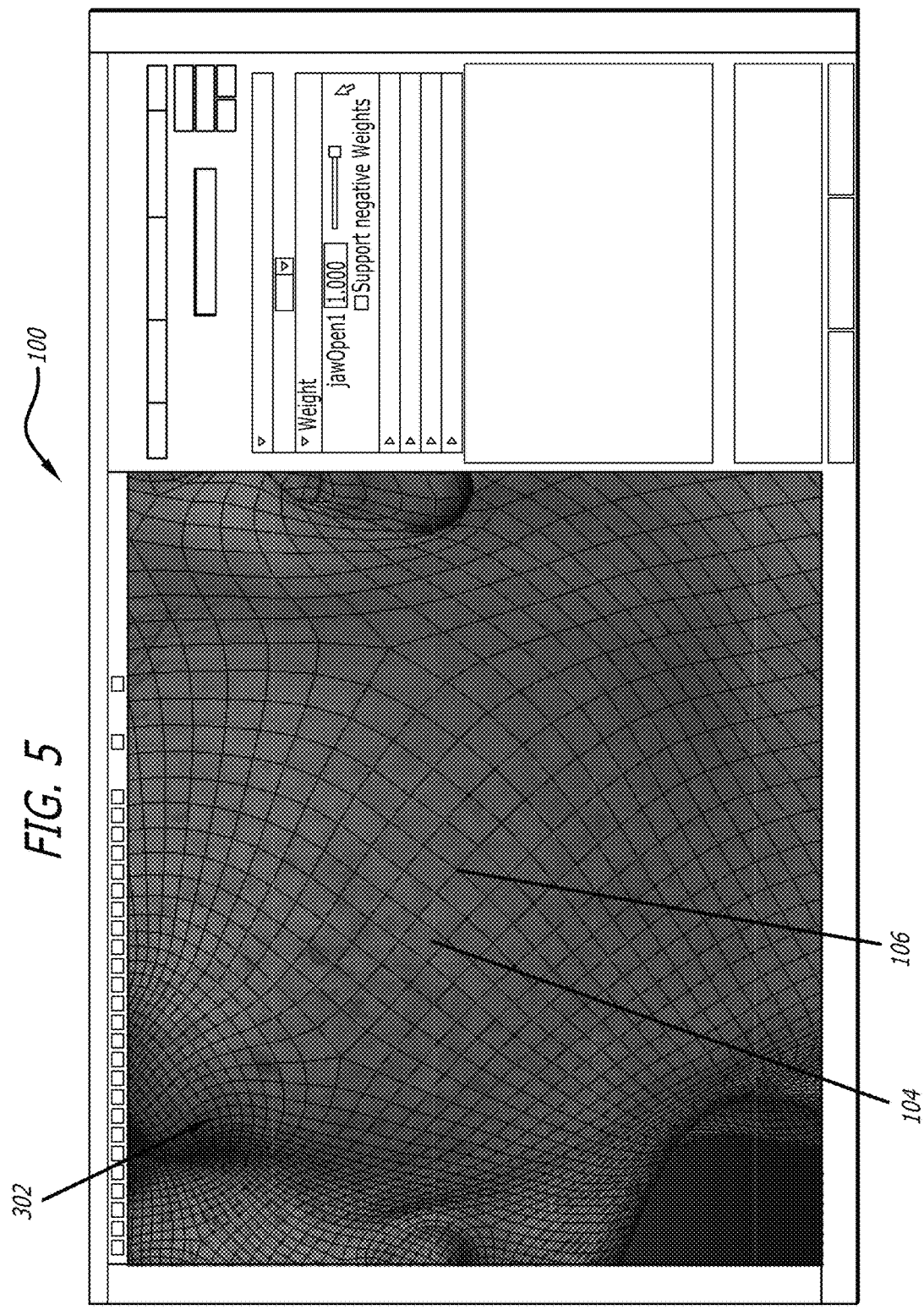
FIG. 5 is an illustration of a driving shape as shown in a design space system for 3-D animation, modeling, and rendering, according to at least one illustrated embodiment.

FIG. 5 is an illustration of a driving shape 302 as shown in the design space system 100 for 3-D animation, modeling, and rendering, according to at least one illustrated embodiment. As shown in FIG. 5, the jaw of the driving shape 302 is open, which generally results in movement and distortion of the plurality of polygons 104. In some implementations, the number of polygons 104 that comprise the driving shape 302 equals the number of polygons 104 that comprise the base shape 102. In some instances, at least some of the polygons 104 in the driving shape 302 may have an increased surface area compared to the corresponding polygons 104 in the base shape 102.

To resolve and prevent distortion, each of the vertices 106 for the driving shape 302 is associated with texels in the U-V space. The U-V space used to apply graphics or texture to the driving shape 302 is the same U-V space used to apply graphics or texture to the base shape 102. At least some vertices 106 in the driving shape 302, though, may be associated with different U-V coordinates, and therefore a different texel, than the same vertex 106 in the base shape 102. When the U-V coordinates associated with a set of vertices 106 change, the associated graphics from the U-V space appear in a different location on the 3-D model. Accordingly, instead of expanding within the same polygon 104 in the driving shape 302, graphics (e.g., designs and textures) appear to have migrated or moved to a different polygon 104 when applied to the driving shape 302.

The change in the U-V space is expressed as a delta value for each of the vertices 106. The delta value equals the change in U-V location for a vertex 106 in the base shape 102 and the same vertex 106 in the driving shape 302. In some implementations, the delta values are obtained by subtracting the U-V coordinates for each vertex in the base shape from the U-V coordinates for the corresponding vertex in the driving shape. Expressing the U-V locations associated with each vertex 106 in the driving shape 302 as a delta value is useful. For example, when at least some of the U-V locations remain constant between the base shape 102 and the driving shape 302, the delta values may be zero, therefore requiring little or no memory space for storing the U-V deltas. In some implementations, the deltas or changes in the U-V coordinate for a vertex may be stored along with the values that specify the change in position for that vertex. The change in position for each vertex may be stored as positional delta values that identify the change in 3-D position, e.g., in X-Y-Z space, for the vertex between the base shape 102 and the driving shape 302. In some implementations, the changes in the U-V coordinates for the vertices in a driving shape may be stored in an array, and the positional information, such as the positional delta values, for the vertices may be stored in the same or in a separate array.

Figure 6:
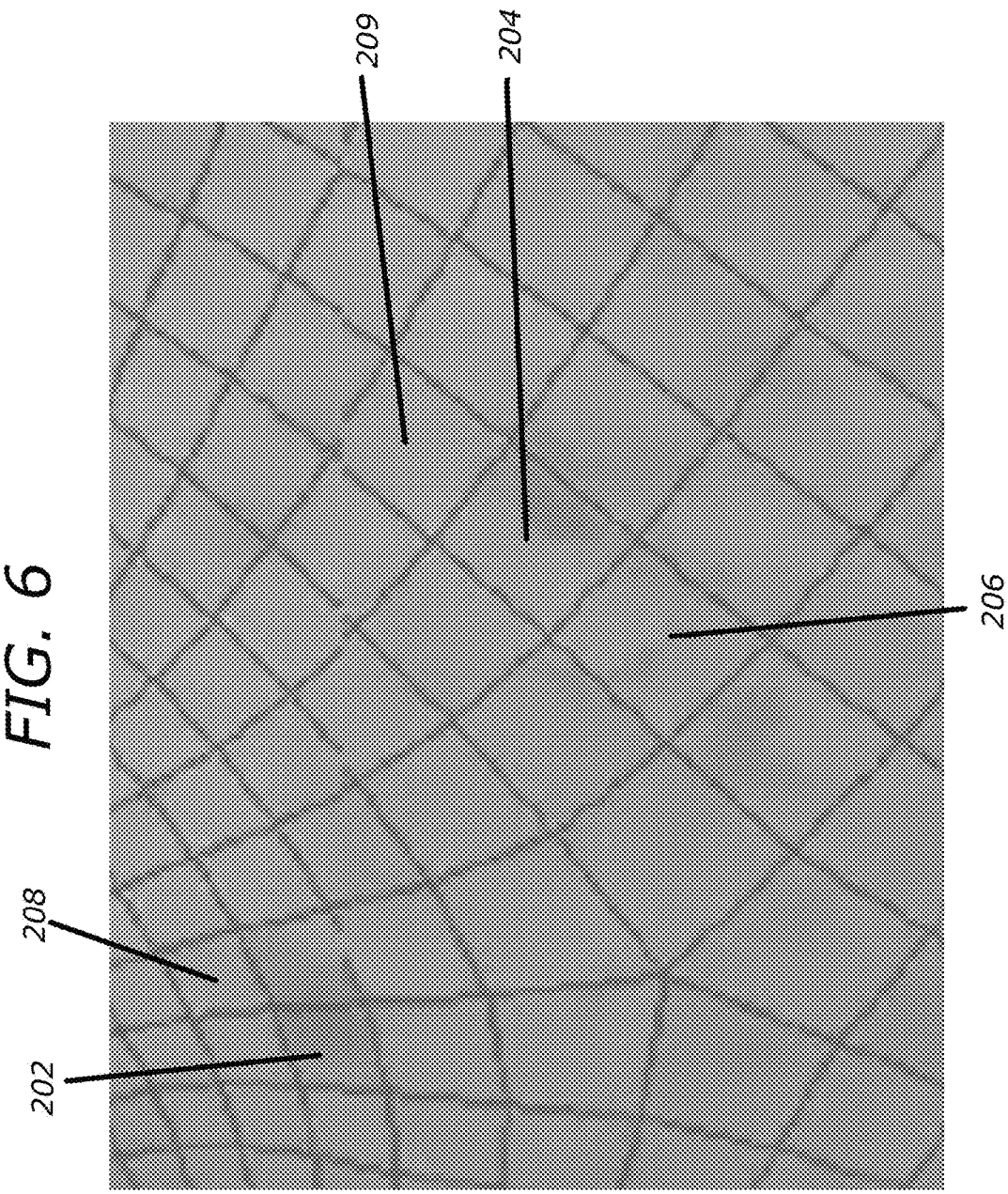
FIG. 6 is an enlarged view of the polygons of the driving shape in the design space system corresponding to the same area of the 3-D model shown in the enlarged view in FIG. 4 for the base shape.

FIG. 6 is an enlarged view of the polygons of the driving shape 302 in the design space system 100 showing the polygons, according to at least one illustrated embodiment. The enlarged view shown in FIG. 6 is of the same area for the driving shape 302 as is the enlarged view shown in FIG. 4 for the base shape 102. As shown in FIG. 6, freckles 202, 204, and 206 are now mapped to different polygons as a result of changing the U-V coordinates associated with each of the vertices in this portion of the driving shape 302. For example, freckle 202 is now moved so that it is no longer located within the polygon 208. Instead, freckle 202 has moved within the driving shape 302 so that it is now located in polygons that are below polygon 208. Similarly, the freckle 204 has moved within the driving shape 302 so that it is no longer located in polygon 209. Now, freckle 204 is located substantially in a polygon that is lower and to the left of polygon 209. The updated locations for the graphics in this section of the driving shape 302 may be expressed in terms of the changes in U-V locations for each vertex 106 as compared to the U-V locations associated with the corresponding vertices 106 in the base shape 102. This process described above results in better animation results with little or no distortion. Thus, animator or designer intervention to correct for any distortion issues is minimized or eliminated.

Figure 7:
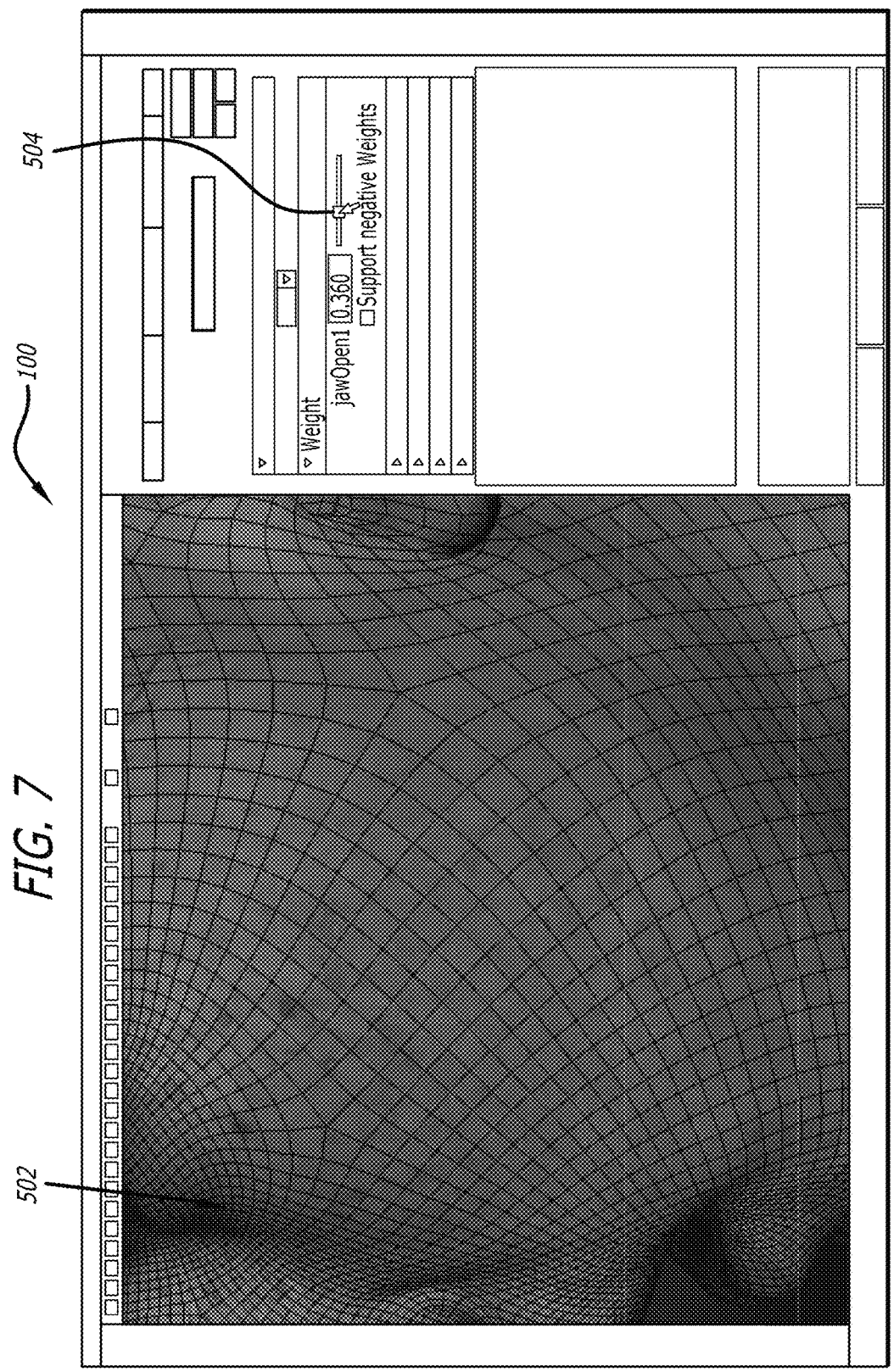
FIG. 7 is an illustration of a 3-D model in which a location of graphics, such as texture and designs, is determined using UV blending, according to at least one illustrated embodiment.

FIG. 7 is an illustration of a 3-D model in which a location of the texture and designs is determined using U-V blending, according to at least one illustrated embodiment. FIG. 7 depicts a blend shape model 502 that has been deformed from the base shape 102 based on the driving shape 302. As shown in FIG. 7, the amount of deformation may be determined based upon a slider 504 that enables a developer to specify the weight value or amount of deformation to be applied based on the desired driving shape 302. In some implementations, the slider 504 may move between a zero (0) position and a one (1) position. When the slider 504 is in the zero position, the blend shape model 502 is the same as the base shape 102 with no weight value or input provided by the driving shape 302. When the slider 504 is in the one position, the blend shape model 502 is the same as the driving shape 302. When the slider 504 is between zero and one, then the blend shape model 502 is in a position or state that represents a transition between the base shape 102 and the driving shape 302. The value specified by the slider 504 corresponds to the amount of transition to be attributed to the driving shape. As shown in FIG. 7, for example, the slider 504 is set to a value of 0.360. Accordingly, in this situation involving a single driving shape, the blend shape model 502 may be in a position or state that corresponds to a transition of 36% between the base shape 102 and the driving shape 302.

In some implementations, a plurality of driving shapes may be used to control and animate a 3-D model. In these implementations, each driving shape may contribute to the deformation of the base shape 102 to arrive at the final position or state of the blend shape model 502. In these situations, the design space system 100 may determine how much deformation to attribute to each of the plurality of driving shapes. Again, in some implementations, the design space system 100 may associate a slider, similar to the slider 504, with each of the plurality of driving shapes, and enable the weight value of each driving shape 302 to be specified according to the associated slider. In some implementations, each slider associated with each of the driving shapes may be set between zero and one.

In some implementations, the U-V coordinates associated with each vertex 106 in the blend shape model 502 are updated based on the deformation contributed by the driving shape 302 to the blend shape model 502. Further, the amount of change in the U-V coordinates contributed by the driving shape 302 to the blend shape model 502 is directly related to the weight value or amount of deformation attributed to the driving shape 302. Moreover, when the U-V locations for the vertices 106 in the driving shape 302 are specified according to deltas, or changes, from the U-V locations in the base shape 102, the weight value specified by the slider 504 is applied to the delta information to determine the U-V locations for the vertices 106 in the blend shape model 502.

Referring again to FIG. 7, for example, the change in the U-V locations for each vertex 106 may be based on the 0.360 weighting provided by the driving shape 302. Thus, the U-V delta information associated with each vertex 106 in the driving shape 302 may be multiplied by 0.36 to arrive at the corresponding transitional U-V delta value associated with each vertex 106 in the blend shape model 502. The final U-V location, or texel, information for the vertices 106 in the blend shape model 502 may be determined by adding the transitional U-V delta values to the U-V location information for the base shape 102, as shown in the following equation:

$$(u,v)' = (u_b, v_b) + w*(\Delta u, \Delta v) \quad \text{Eq. 1}$$

in which (u, v)' represent the updated U-V coordinates associated with a vertex 106 in the blend shape model 502; $(u_b, v_b)$ represent the U-V location associated with the same vertex 106 in the base shape 102; w represents the weight value associated with the slider 504; and $(\Delta u, \Delta v)$ represent the U-V delta information associated with the same pixel 106 within the driving shape 302.

More generally, in a blend shape system using absolute coordinates, the U-V coordinates for a blend shape model may be specified by the following equation:

$$(u, v)' = (u_b, v_b) + \sum_{k=0}^{n} f(w_k) * (\Delta u_k, \Delta v_k) \quad \text{Eq. 2}$$

in which (u, v)' represent the updated U-V coordinates associated with a vertex 106 in the blend shape model; $(u_b, v_b)$ represents the U-V location associated with the same vertex 106 in the base shape 102; $w_k$ represents the weight value associated with the slider 504 for a driving shape; $(\Delta u_k, \Delta v_k)$ represents the U-V delta information for the driving shape associated with the same pixel 106; and k represents one of the driving shapes that contribute to the blend shape model 502. The values for $(\Delta u_k, \Delta v_k)$ may be obtained using the following equations:

$$\Delta u = \text{drivingShape·}u - \text{baseShape·}u \quad \text{Eq. 3}$$

$$\Delta v = \text{drivingShape·}v - \text{baseShape·}v \quad \text{Eq. 4}$$

In some implementations, the design space system 100 stores the U-V and positional information for the base shape 102. Accordingly, the design space system 100 can determine the correct U-V and positional values for a driving shape using the U-V and positional values for the base shape 102 along with the U-V delta and positional delta values for that driving shape.

The product $f(w_k)*(\Delta u_k, \Delta v_k)$ may provide transitional U-V delta values contributed by each driving shape to the U-V coordinates assigned to each of the vertices in the final blend shape. The Equation 2 above may be modified in a relative blend shape system in which the positional information of the driving shapes is already provided relative to the position of the base shape 102. In particular, the term $(\Delta u_k, \Delta v_k)$ becomes $(u_k, v_k)$ because the U-V coordinates are already specified in terms of the offset from the base shape 102.

Updating the U-V coordinates for the vertices in the blend shape model enables the graphics being applied to the blend shape model to slide across the surface of the blend shape model, thereby providing a more realistic representation with less or no distortion when compared to current methods for mapping graphics onto 3-D models in which the U-V coordinates remain static and set for each vertex even as the 3-D model moves and is altered.

Further, a function may be applied to each w value to provide an effective weight value for each driving shape. For example, the value of w may be obtained by using a slider bar with values greater than 1; in this situation, the function applied to w may be:

$$f(w) = \frac{w - sliderFramestart}{sliderFramewidth} \quad \text{Eq. 5}$$

In this equation, the value of w equals the value set for the slider; sliderFramestart equals the starting value for the slider bar; and sliderFramewidth equals the total width for the slider bar.

Figure 8:
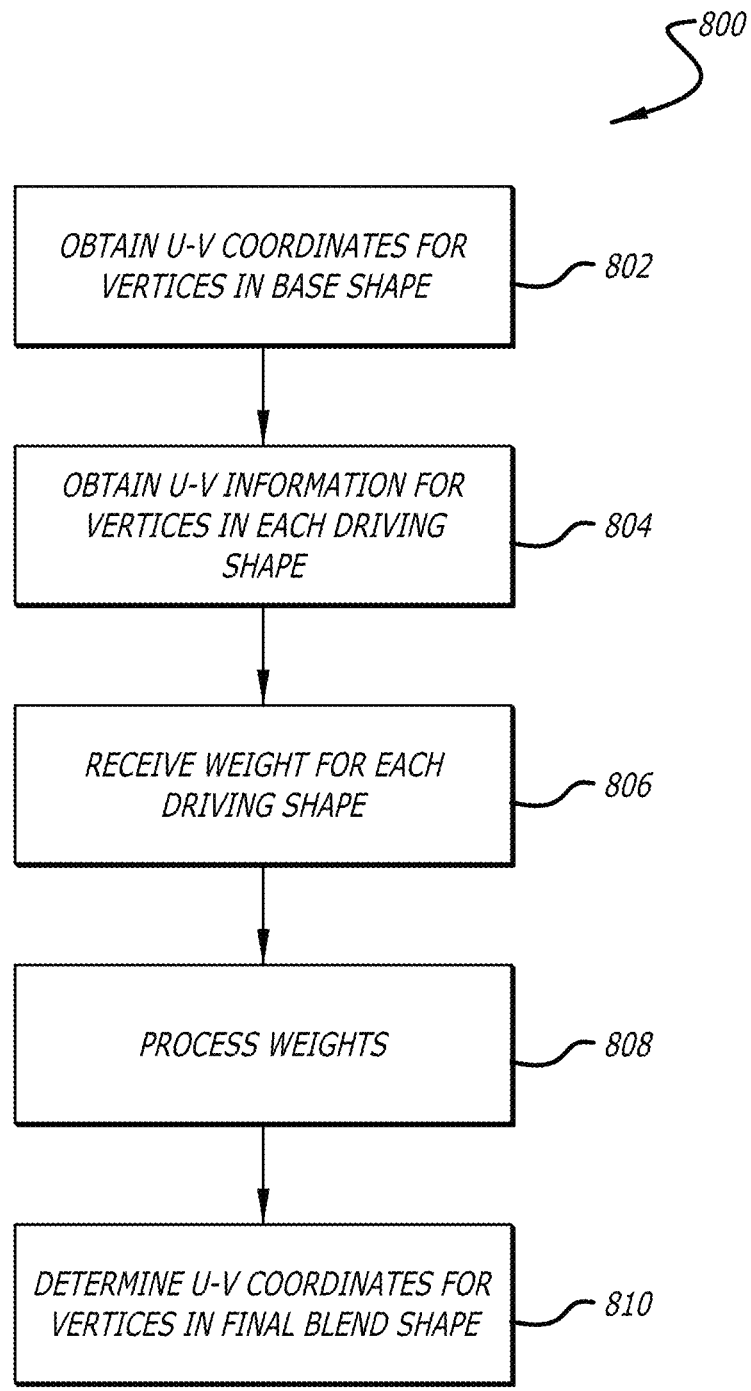
FIG. 8 is a logic flow diagram showing an example method for U-V blending, according to at least one illustrated embodiment.

FIG. 8 is a logic flow diagram showing an example method 800 for U-V blending, according to at least one illustrated embodiment. In 802, U-V coordinates associated with each vertex in a base shape are obtained. In some implementations, the U-V coordinates are normalized to be between zero and one. Graphics information is applied to each polygon in the base shape based on the U-V coordinates associated with each of the polygon's vertices.

In 804, the U-V information associated with each of the vertices for each driving shape that contributes to the final, blend shape model are obtained. In some implementations, a design space system 100 is used to specify the driving shapes. For example, the design space system 100 may show multiple driving shapes on a single screen. The design space system 100 is used to select each driving shape that will contribute to a final, blend shape model. In some implementations, the UN information associated with each vertex in a driving shape includes U-V coordinates that correspond to texels in the U-V space. In some implementations, the U-V information associated with each vertex in a driving shape comprises delta values that specify the change in the U-V location as compared to the U-V location specified for the same vertex in the base shape. The delta values are obtained by subtracting the UN coordinates for each vertex in the base shape from the U-V coordinates for the corresponding vertex in the driving shape.

In 806, a weight value is received for each driving shape. The weight value specifies the contribution of each driving shape to the blend shape model. In some implementations, the weight value is specified by a user interacting with the design space system 100. In such implementations, the weight value is input by the user using a slider, where each driving shape has an associated slider. The slider is positioned to equal a value between zero and one in which an increasing value assigned by a slider corresponds to an increasing contribution by the associated driving shape to the final, blend shape model. In some implementations, the weight values are determined and specified by an automated process. For example, when the process is used as part of developing an animation, an automated process may calculate the weight values to be assigned to each driving shape in order to animate a character or object in a scene. Such animation may further occur in real-time, for example, when used for animation in video games.

In 808, the weight values received in 806 are processed. In some implementations, processing under 808 may be skipped if the value of the weight value assigned to the slider equals the weight value to be multiplied with the U-V delta values in 810. When multiple driving shapes contribute to the final blend shape model, 808 may include obtaining and processing additional weight values for each driving shape that contributes to the final blend shape model and additional U-V coordinates for each driving shape, if needed.

In 810, the U-V location is determined for each of the vertices in the final, blend shape model. In some implementations, the determination in 810 uses the U-V coordinates for each vertex in the base model to calculate a change to the U-V values based on the contribution from each driving shape. The individual contribution by each driving shape to the change in U-V coordinates for each vertex is determined in some implementations by multiplying the processed weight value determined in 808 for the driving shape with the U-V deltas for the vertex obtained in 804 for the same driving shape to calculate transitional U-V delta values for each vertex. The transitional U-V delta values contributed by each driving shape are added together, and this sum is added to the U-V coordinates associated with the vertex in the base shape to calculate the U-V coordinates for the same vertex in the blend shape model. The method ends after 810.

Figure 9:
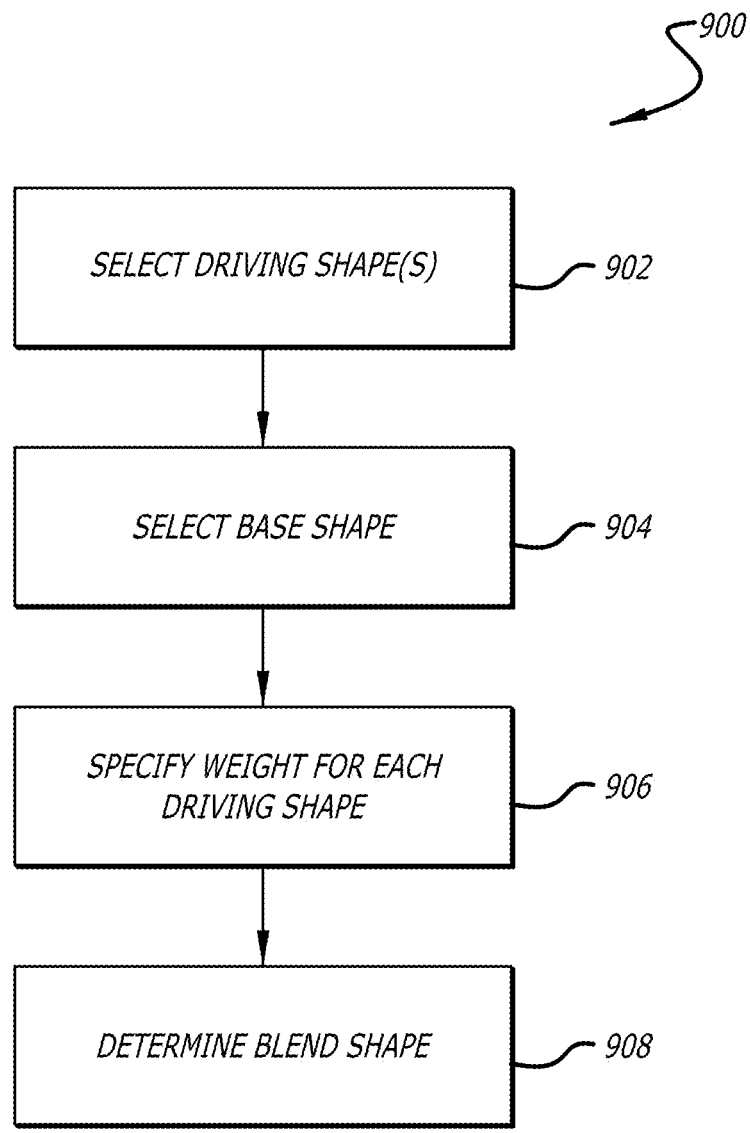
FIG. 9 is a logic flow diagram showing an example method for U-V blending by a designer using the design space system 100, according to at least one illustrated embodiment.

FIG. 9 is a logic flow diagram showing an example method 900 for U-V blending by a designer using the design space system 100, according to at least one illustrated embodiment. In 902, a user selects one or more driving shapes to be used for U-V blending.

In 904, the user selects the base shape to be used for U-V blending.

In 906, the user selects the weight values to be used for each driving shape to create the final, blend shape model. The design space system 100 provides sliders for each of the selected driving shapes for the user to control the weight that each driving shape contributes to the final, blend shape model. As the user moves the slider to modify the weight values for each driving shape, the design space system 100 modifies the U-V locations assigned to each vertex, thereby enabling the graphics to slide across the surface of the final, blend shape model. With this technique, the designs in the U-V space are associated with different polygons within the blend shape model.

In 908, the final blend shape model is determined based on the base shape, driving shapes, and the weight values. It is again noted that the assignment of weight values can be made automatically using the processing system described herein.

Figure 10:
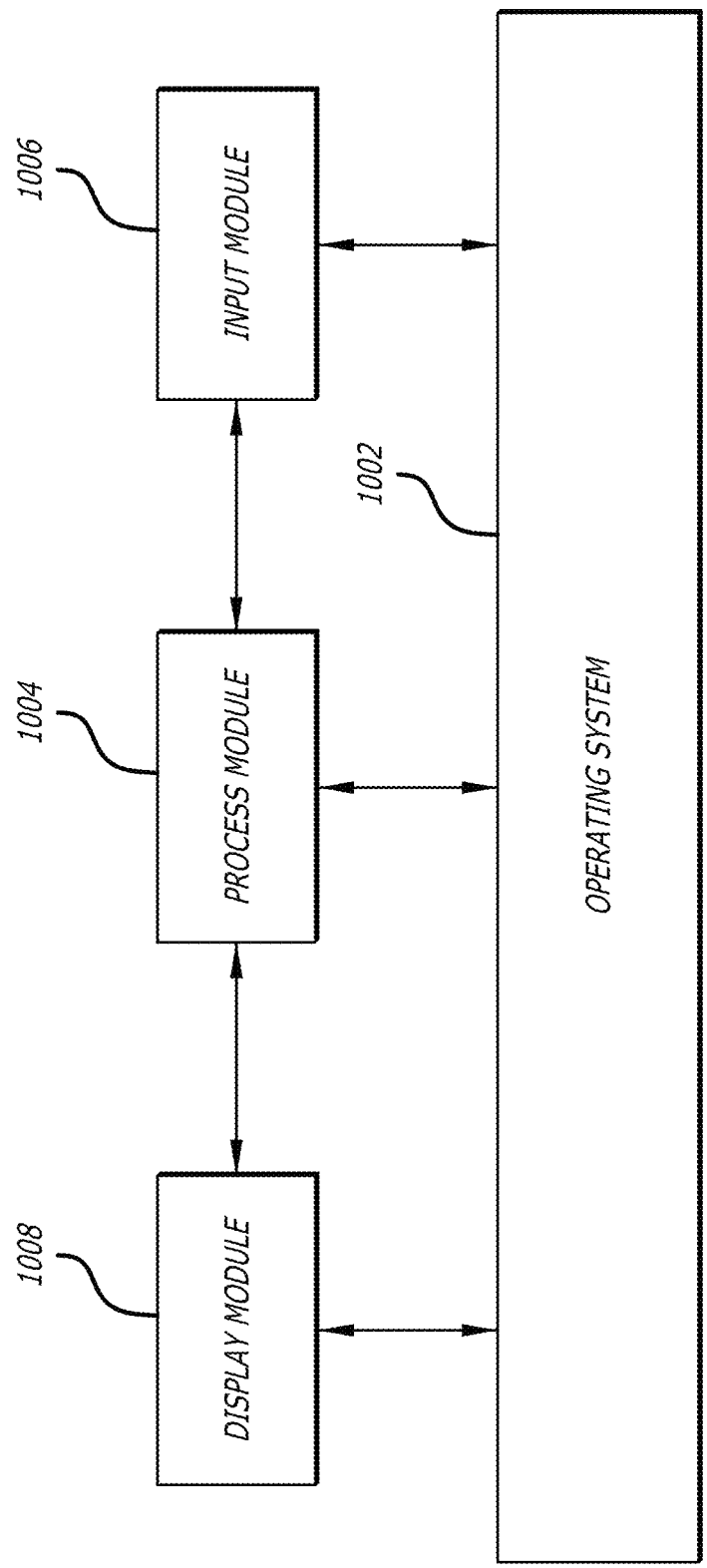
FIG. 10 is a block diagram of a system for generating 3-D model blend shapes from base shapes and driving shapes.

FIG. 10 is a block diagram of a system for generating 3-D model blend shapes from base shapes and driving shapes. Software for using a base shape and one or more driving shapes to construct a blend shape includes an operating system 1002 providing an environment for a process module 1004 to interact with various components and peripherals of the system. The process module 1004, the input module 1006, and the display module 1008 each interact with the operating system 1002 and each other so as to determine the positional and the U-V location information for each vertex in the blend shape. For example, the process module 1004 implements a graphical user interface. User input, such as the base shape or the driving shapes, or the various weight values for each driving shape, is received by the operating system 1002 and processed by the input module 1006 to determine the blend shape. For example, when a user moves a mouse, the operating system 1002 processes the movement and displays a pointer on the display. When a user clicks a button on the mouse, or other input device so as to indicate a selection, the input module 1006 receives and processes the input, and the process module 1004 updates data structures appropriately.

Data associated with base shapes, driving shapes, and blend shapes are stored on a computer-readable medium, such as, for example, random-access memory, a hard drive, flash memory, or the like. The memory can be located either locally or remotely to the system. Data associated with base shapes, driving shapes, and blend shapes may be stored in data structures that may be generated by process logic in the course of determining modified positional and U-V location information for each vertex.

The techniques and methods for U-V blending described herein provide technical improvements to enhance 3-D design capabilities. One such technical improvement enables the design space system 100 to automate certain processes for applying designs and textures to 3-D models. In current methods, an animator generally needs to modify the texture and designs, or specify the different percentages to be contributed by multiple U-V spaces, as a blend shape changes to account for unnatural changes and variations to the polygons that comprise the blend shape—that is, stretching and swimming. The U-V blending techniques and methods described herein, by contrast, remove this additional burden from the animator. Once the U-V assignment have been made to the base shape and to the driving shapes, the U-V assignments for the blend shapes are quickly and automatically determined according to the weight values assigned to each driving shape. Accordingly, a developer or animator can customize the graphics to be applied to a blend shape in various ways. For example, the animator can modify the assigned U-V locations for vertices in the driving shapes, which impacts the delta values for the vertices in the driving shape. As another example, the animator varies the assigned U-V locations for vertices in the blend shape by controlling the weight values associated with each driving shape. In addition, by storing the U-V location information for each vertex in a driving shape in terms of the change from the U-V location in the base shape, the design space system 100 may reduce the amount of memory needed to store the updated U-V location information for the driving shapes.

The techniques and methods for U-V blending can be used in other technology and situations in which graphics, such as texture and designs, are applied to a 3-D model comprising a polygon mesh. For example, U-V blending may be used on other parts of the body of a 3-D model besides the face to provide more realistic representations of, for example, moles or tattoos on arms or legs. The techniques and methods for U-V blending can be used in an animation process in which one or more shapes may have multiple U-V location assignments. Time interpolation techniques may be used to modify the U-V locations assigned to each vertex as a shape transitions between positions.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

One or more embodiments of the systems disclosed herein may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real-Time Messaging Protocol) may be implemented, which essentially send data in small packets from the server to the client device in real-time at the encoded bitrate of the data. Adaptive streaming may also be implemented. Adaptive streaming almost exclusively relies on HTTP for the transport protocol. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the systems disclosed herein may be located on (i.e., processed, stored, executed, or the like; or include one or more hardware or software components) a single computer system or may be distributed among a plurality of computer systems attached by one or more communication networks (e.g., internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system) that may be dedicated to serve the needs of one or more other computer systems or components across a communication network and/or system bus. The one or more servers may provide a central processing location for one or more aspects of the systems disclosed herein.

Again, various aspects of the systems, methods, function, and steps corresponding thereto disclosed herein may be implemented on one or more computer systems using hardware, software, firmware, or combinations thereof. Those of ordinary skill in the art will appreciate that one or more circuits and/or software may be used to implement the system and methods described herein. Circuits refer to any circuit, whether integrated or external to a processing unit such as a hardware processor. Software refers to code or instructions executable by a computing device using any hardware component such as a processor to achieve the desired result. This software may be stored locally on a processing unit or stored remotely and accessed over a communication network.

As disclosed herein, a processor or hardware processor may refer to any hardware processor or software processor. A software processor may include or otherwise constitute an interpreter that is executed by a corresponding hardware processor. A computer system according to any embodiment disclosed herein is configured to perform any of the described functions related to the various embodiments of the systems disclosed herein.

As disclosed herein, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the systems disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such that function as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the systems and methods disclosed herein are not limited to being executed on any particular computer system or group of computer systems.

Some methods, functions, steps, or features have been described as being executed by corresponding software by a processor. It is understood than any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step. It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analyzing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

The various implementations described above can be combined to provide further implementations. The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, if any, are incorporated herein by reference, in their entirety. Aspects of the embodiments can be modified, if necessary, to employ concepts of the various patents, applications and publications to provide yet further embodiments. These and other changes can be made to the implementations in light of the above-detailed description.

These and other changes can be made to the embodiments in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method for modifying U-V values for a blend shape model, the blend shape model having a surface and being formed by deforming a base shape according to a drive shape, the base shape comprising a first set of vertices, and the drive shape comprising a second set of vertices corresponding to the first set of vertices, the method comprising:
    associating U-V values from a graphics map to each vertex in the first set of vertices as base U-V values;
    determining U-V delta values for each vertex in the second set of vertices;
    receiving a weight value for the drive shape;
    applying the weight value to the U-V delta values to determine transitional U-V delta values for each vertex in the second set of vertices;
    combining the transitional U-V delta values for each vertex with the base U-V values associated with the corresponding vertex in the first set of vertices to determine updated U-V values for each vertex;
    associating the updated U-V values with one or more vertices that comprise the deformed base shape, in which each of the one or more vertices receives an updated U-V value;
    applying the graphics map to the deformed base shape based upon the one or more associated, updated U-V values; and
    presenting an improved blend shape model having graphics or textures that appear to move or slide across the surface of the blend shape model based upon the updated U-V values associated with the one or more vertices of the deformed base shape.

2. The method of claim 1, wherein determining the U-V delta values comprises subtracting the U-V values associated with the vertices in the first set of vertices from the U-V values associated with the vertices in the second set of vertices.

3. The method of claim 1, further comprising: associating the U-V delta values for a vertex with positional delta values for the vertex.

4. The method of claim 1, including a second drive shape having a third set of vertices corresponding to the first set of vertices, the method further comprising:
    determining second U-V delta values for each vertex in the third set of vertices;
    receiving a second weight value;
    applying the second weight value to the second U-V delta values to determine second transitional U-V delta values for each vertex in the third set of vertices;
    combining the second transitional U-V delta values for each vertex, the first transitional U-V delta values for each corresponding vertex, and the base U-V values associated with each corresponding vertex to determine second updated U-V values for each vertex; and
    using the second updated U-V values for each vertex to apply graphics to the blend shape model.

5. The method of claim 1, wherein the graphics applied to the blend shape model are applied from the graphics map.

6. The method of claim 1, wherein using the updated U-V values for each vertex to apply graphics to the blend shape model further includes sliding the graphics across the surface of the blend shape model.

7. The method of claim 1, wherein applying the weight value to the U-V delta values to determine transitional U-V delta values for each vertex in the second set of vertices further comprises applying a function to the weight value to determine an effective weight value and multiplying the effective weight value with the U-V delta values.

8. A method for rendering a three-dimensional image, the three-dimensional image having a surface, the method comprising:
obtaining a drive shape;
obtaining a base shape;
determining U-V values associated with vertices in the drive shape;
determining U-V values associated with vertices in the base shape;
receiving a weight value for the drive shape;
determining U-V delta values for each vertex by subtracting the U-V values for the base shape from the U-V values for the drive shape;
associating the U-V delta values for a vertex with positional delta values for the vertex;
multiplying the positional delta values and the U-V delta values by the weight value to determine transitional position values and transitional U-V values;
storing the transitional position values and transitional U-V values in a memory;
accessing the memory as the base shape is rendered into a blend shape based on the weight value for the drive shape and graphics from a graphics map, wherein U-V values for the blend shape are based on the transitional U-V values and wherein position values for the blend shape are based on the transitional position values, the graphics remaining consistent as the three-dimensional image transitions between blend shapes and avoiding distortion in the three-dimensional image; and
presenting an improved three-dimensional image having graphics or textures that appear to move or slide across the surface of the three-dimensional image based upon the U-V values and the position values for each blend shape.

9. The method of claim 8, wherein obtaining the positional delta values further comprises:
determining positional values for each vertex in a first set of vertices as base positional values;
determining positional values for each vertex in a second set of vertices;
determining positional delta values for each vertex in the second set of vertices;
multiplying the weight value by the positional delta values to determine transitional position values for each vertex; and altering the blend shape model according to the transitional position values.

10. The method of claim 8, further including a second drive shape, the method further comprising:
determining second U-V delta values for each vertex in the second drive shape;
receiving a second weight value;
applying the second weight value to the second U-V delta values to determine second transitional U-V delta values for each vertex in a third set of vertices;
combining the second transitional U-V delta values for each vertex, the first transitional U-V delta values for each corresponding vertex, and base U-V values associated with each corresponding vertex to determine second updated U-V values for each vertex; and
using the second updated U-V values for each vertex to apply graphics to the blend shape model.

11. The method of claim 8 further comprising storing the transitional position values and transitional U-V values in a memory array.

12. The method of claim 8 wherein avoiding distortion in the three-dimensional image includes sliding the graphics across the surface of the three-dimensional model as the three-dimensional image transitions between blend shapes.

13. A non-transitory computer-readable medium having computer instructions stored thereon, the computer instructions executable by a computer system to carry out a method for determining a blend shape model, the blend shape model having a surface and being formed by deforming a base shape according to a drive shape, the base shape comprising a first set of vertices, and the drive shape comprising a second set of vertices corresponding to the first set of vertices, the method comprising:
associating U-V values from a graphics map to each vertex in the first set of vertices as base U-V values;
determining U-V delta values for each vertex in the second set of vertices;
receiving a weight value for the drive shape;
applying the weight value to the U-V delta values to determine transitional U-V delta values for each vertex in the second set of vertices;
combining the transitional U-V delta values for each vertex with the base U-V values associated with the corresponding vertex in the first set of vertices to determine updated U-V values for each vertex;
associating the updated U-V values with one or more vertices that comprise the deformed base shape, in which each of the one or more vertices receives an updated U-V value; and
applying the graphics map to the deformed base shape based upon the one or more associated, updated U-V values: and presenting an improved blend shape model having graphics or textures that appear to move or slide across the surface of the blend shape model based upon the updated U-V values associated with the one or more vertices in the deformed base shape.

14. The non-transitory computer-readable medium of claim 13, wherein determining the U-V delta values comprises subtracting the U-V values associated with the vertices in the first set of vertices from the U-V values associated with the vertices in the second set of vertices.

15. The non-transitory computer-readable medium of claim 13, wherein the method further comprises: associating the U-V delta values for a vertex with positional delta values for the vertex.

16. The non-transitory computer-readable medium of claim 15, further having a second drive shape having a third set of vertices corresponding to the first set of vertices, wherein the method further comprises:
determining second U-V delta values for each vertex in the third set of vertices;
receiving a second weight value;
applying the second weight value to the second U-V delta values to determine second transitional U-V delta values for each vertex in the third set of vertices;
combining the second transitional U-V delta values for each vertex, the first transitional U-V delta values for each corresponding vertex, and the base U-V values associated with each corresponding vertex to determine second updated U-V values for each vertex; and
using the second updated U-V values for each vertex to apply graphics to the blend shape model.

17. The non-transitory computer-readable medium of claim 13, wherein the graphics applied to the blend shape are applied from the graphics map.

18. The non-transitory computer-readable medium of claim 13, wherein using the updated U-V values for each vertex to apply graphics to the blend shape model further includes sliding the graphics across the surface of the blend shape model.

19. The non-transitory computer-readable medium of claim 13, wherein applying the second weight value to the second U-V delta values to determine second transitional U-V delta values for each vertex in the third set of vertices further includes applying a function to the weight value to determine an effective weight value and multiplying the effective weight value with the U-V delta values.

20. The non-transitory computer-readable medium of claim 19, wherein the method further comprises:
obtaining the weight value from a slider feature rendered on a display of the computer system, the slider feature having a slider start value and a total slider width,
wherein applying the weight value to the U-V delta values to determine transitional U-V delta values for each vertex in the second set of vertices further comprises:
subtracting the slider start value from the weight to calculate a difference;
dividing the difference by the total slider width to calculate an effective weigh value; and
multiplying the U-V delta values by the effective weight value to calculate the transitional U-V delta values.

* * * * *